United States Patent Office 3,808,323
Patented Apr. 30, 1974

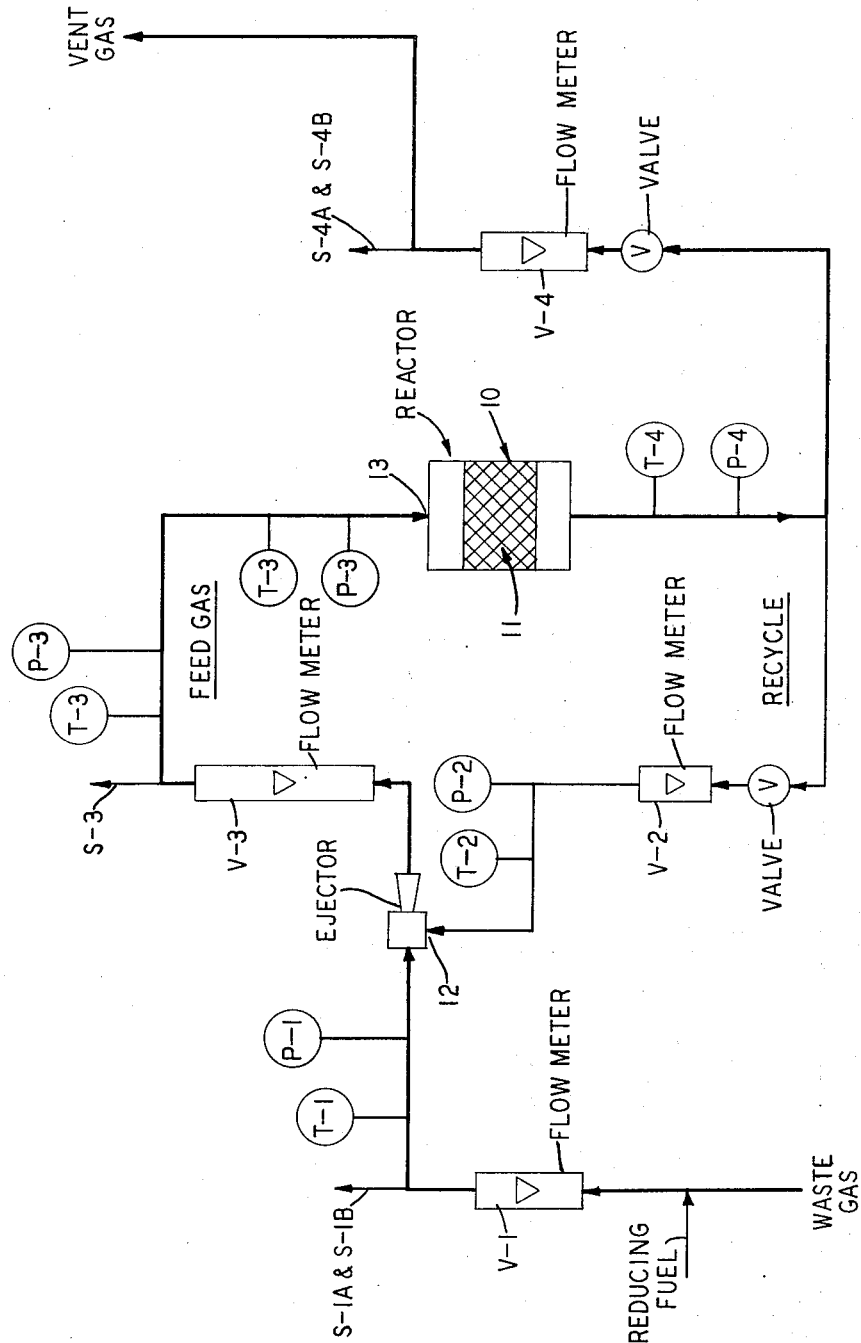

3,808,323
PURIFICATION OF WASTE GASES CONTAINING OXIDES OF NITROGEN AND OXYGEN
Martin F. Collins, Somerset, N.J., and Romuald Michalek, Astoria, N.Y., assignors to Engelhard Minerals & Chemicals Corporation
Filed Nov. 16, 1971, Ser. No. 199,239
Int. Cl. B01d 53/34
U.S. Cl. 423—219                  3 Claims

ABSTRACT OF THE DISCLOSURE

Waste gases containing nitrogen oxides and oxygen are purified in a catalytic process in which a portion of the effluent from the catalytic reactor is recycled back to the inlet by means of an ejector to effect controlled combustion in the reactor.

BACKGROUND OF THE INVENTION

This invention relates to a process for the purification of waste streams containing oxides of nitrogen, and in particular to the removal of oxides of nitrogen from waste streams which also contain free oxygen.

Among the known processes for converting nitrogen oxides in waste streams to innocuous gases are those involving catalytic reduction with a reducing fuel and simultaneous recovery of the heating values. Examples of reducing fuels are $H_2$, CO, natural gas, light hydrocarbons such as naphtha, methane, propane, butane, ethane and various industrial waste gases containing a reducing agent such as $H_2$ or CO. In this type of process for true abatement the objective is to reduce the oxides of nitrogen to essentially $N_2$ and $H_2O$, and/or $CO_2$ and many single and multi-stage processes have been proposed to solve this pollution abatement problem.

U.S. Pat. No. 3,402,015, for example, discloses a two-stage process in which the amount of oxides of nitrogen to the catalytic reactor is controlled by a first stage adsorbent. Also disclosed is that a partial recycle of the second stage reactor effluent may be used for reduction of heat input supplied by an in-line burner upstream from the reactor. Recirculation of the stream is accomplished by a high temperature blower or compressor—a system which is prohibitively expensive. It will be noted that the waste stream in the process of this patent does not contain a significant amount of $O_2$ since the temperature rise in the reactor is not a problem and, in fact, a preheat burner is included in the recycle line to supply additional heat to the reactor.

In the purification of waste streams which also contain free oxygen, such as the tail gas of a nitric acid plant, the presence of oxygen creates a major problem. The reaction of the $O_2$ with the fuel is highly exothermic and high temperatures in the catalyst bed deactivate the catalyst. The amount of excessive detrimental heat generated in the bed is related directly to the free $O_2$ content of the stream. One approach to solving this problem is to use multi-catalyst beds. U.S. Pat. No. 2,970,034 discloses a multi-bed process in which there is controlled $O_2$ removal in the first stage, nitrogen oxide removal in the second stage, and between the two stages the stream is cooled. Optimum performance of this multi-bed catalyst requires high activity in the first stage. A loss of combustion efficiency will result in a lower first stage gas outlet temperature, so lowering the inlet temperature to the second stage. The removal of this would be a loss of activity for $NO_x$ removal in the second stage.

The object of the present invention is to provide a process for the purification of waste stream containing nitrogen oxides and free oxygen. Another object is to accomplish the purification in a simple, reliable process which is economically feasible commercially. A further object is to provide for such purification by a recycle process in a single catalyst stage performing on the reducing side, the recycle being accomplished without the use of expensive blowers and compressors. These and other objects are accomplished by the invention described below.

SUMMARY OF THE INVENTION

In accordance with this invention a waste stream containing oxides of nitrogen and free oxygen is purified by a process which comprises recycling at least part of the catalytic reactor effluent back to the feed side of the reactor to dilute the oxygen concentration in the reactor, the recycle in such process being accomplished by using an ejector.

Many advantages are realized through the use of the ejector-recycle system of the present invention, with respect to the catalyst life and performance, heat recovery and saving in fuel. Moreover the advantages are gained with the use of a simple relatively inexpensive device that has no moving parts and needs little maintenance.

THE DRAWING

The accompanying figure is a flow diagram illustrating the process as applied to tail gas from a nitric acid plant. In the process of the figure there is shown a catalytic reactor 10 containing catalyst 11 to which a feed gas consisting of the waste stream from the nitric acid plant and a reducing fuel are fed by way of ejector 12 to the reactor inlet 13. In the reactor the oxides of nitrogen and oxygen in the stream are reduced and the effluent from the reactor 10 is recycled, at least partially, by the ejector 12. This recycle stream serves to dilute the $O_2$ concentration in the reactor. That part of the effluent not recycled is discharged to the atmosphere through expanders (not shown). Additional heat recovery from the effluent from the reactor is obtained in waste heat boiler (not shown).

The desired temperature profile in the reactor and the amount and rate of recycle varies depending on such factors as the concentration of oxides

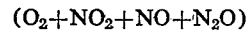

$$(O_2 + NO_2 + NO + N_2O)$$

in the waste stream, the kind of reducing fuel used, the catalyst, the degree of desired purification, the maximum allowable temperature of waste gas to the expanders and the need for steam production.

DETAILED DESCRIPTION OF PREFERRED EMBODIMENTS

As indicated above, the present process involves removal of oxides of nitrogen from waste gases which also contain oxygen by catalytic reduction with a reducing fuel. The process is illustrated herein with nitric acid plant tail gas as the waste stream and methane as the reducing fuel. Methane and natural gas are often used in this type of process because of their availability and relatively low cost. With these fuels, however, the problem of excessive temperature rise in the catalytic bed is particularly acute. Typically the methane is present in about 10% to 20% excess of the stoichiometric amount required for complete reduction of the $O_2$ and of the oxides of nitrogen.

The mixture of the fuel and waste gas is contacted with a catalyst. Generally the catalyst used is a platinum group metal such as palladium, platinum, rhodium, ruthenium, osmium, or iridium or combinations thereof. It is known in the art of gas purification to use the catalysts in the form of unsupported wire mesh or supported on a carrier such as a refractory oxide, alumina, zirconia, silica, diatomaceous earth. The carrier of the catalyst may be in the form of pellets, granules, or powder. It is also known to use a ceramic honeycomb structure as a skeletal support on which a suitable catalyst is deposited. The supported catalysts may contain about 0.01% to 5.0% platinum group metal based on the total weight of the catalyst plus the support. Examples of suitable catalysts are given in U.S. Pat. Nos. 2,970,034 and 3,118,727.

In the present process the mixture of fuel and gas is fed to the inlet of the reactor which contains the catalyst in a single catalyst bed.

Suitable inlet temperature to the reactor is governed by the ignition temperature of the fuel used. With methane as the fuel and a precious metal catalyst the ignition temperature is in the neighborhood of about 450° C. to 500° C. and the inlet pressure may be 90 to 100 p.s.i.g. The maximum outlet temperature varies with the catalyst, but it should not exceed about 800° C., in order to avoid deactivating the catalysts presently known in the art for this reaction.

It was noted above that the detrimental heat in the bed is directly related to the $O_2$ content of the stream. To solve the problem of excessive temperature rise in the bed due to the high $O_2$ concentration at least a part of the effluent from the reactor is recirculated back to the inlet of the reactor. Optimally the effluent from the reactor is free of $O_2$. The purpose of the recycle is to dilute the $O_2$ content in the reactor. By choosing a suitable recycle rate even if the waste gas contains as high as 4.0% to 5.0% free oxygen, the diluted feed can be made to enter the reactor containing only approximately 2.0% to 2.5% $O_2$. In this case 100% of reactor effluent gas is recycled.

Concomitant benefits are achieved by the recycle in addition to the temperature control. As noted above, 10% to 20% excess fuel is used in order to obtain the desired purification. By recirculating a part of the effluent, unreacted fuel is recycled back to the reactor; thus less fuel must be added to that waste gas in order to maintain the desired excess at the inlet of the reactor. Also, the recycle produces a "boot-strap effect" which allows start-up without it being necessary to preheat the waste gas to the temperature required for essentially complete reaction. As soon as a partial reaction takes place, the ejector-recycle system heats the tail gas to the temperature at which essentially complete reaction occurs. If the waste gas is at or close to the ignition temperature, the recycle gas is cooled to that temperature before mixing. The heat can be recovered, e.g. by steam recovery in reboilers.

Recycle is accomplished through the use of an ejector. Ejectors are known. Generally they have been used in the chemical industry for vacuum applications. They are essentially simplified vacuum pumps, having no pistons, valves, rotors, or other moving parts. As previously used steam or an inert gas can be employed in the ejector to discharge the evacuated gas at a high velocity. The steam carries the gas which has been evacuated from the equipment through a venturi-shaped diffuser which converts some of the velocity energy of the steam into negative pressure energy. In the present application the recycle gas is fed to the venturi-shaped diffuser of the ejector and together with the waste stream plus fuel is fed to the inlet of the reactor. The recycle gas is fed to the ejector at a rate predetermined to provide a suitable $O_2$ content in the reactor, as illustrated in the following example.

EXAMPLE

A portion of the tail gas of a 500 ton per day (T/D) nitric acid plant is used in the experiments of this example to illustrate the recycle-ejector system of this invention. Typically such waste streams are composed of about 0.2% to 0.5% nitrogen oxides, 3.0% to 5.0% free $O_2$ and the balance $N_2$. Composition is given in volume percent on a dry basis. To demonstrate the effectiveness of this invention air was added to give mixtures in which the $O_2$ content ranged from about 2.5% to 6.0%. A single stage reactor, as defined above, was used. The inlet temperature of the feed to the reactor ranged from about 393° C. to 602° C. and a maximum outlet temperature of about 788° C. was allowed. Natural gas was used as the reducing fuel in an amount to give about 10% excess $CH_4$. The flow rates to the reactor varied from about 2200 to 3200 SCFH. The catalyst in the reactor was approximately 5 to 6 pounds of 0.5% palladium on ¼ inch $Al_2O_3$ spheres.

The ejector was designed with three replaceable nozzles to recirculate approximately 30%, 60% and 100% of the reactor effluent gas based on a temperature of about 900° F. and a pressure of about 90 p.s.i.g. of the waste gas of the plant.

Measurements of temperature pressure, flow, and concentrations of $NO_x$ (nitrogen oxides), $O_2$ (free oxygen) and $CH_4$ were made of the waste gas, the recycle gas, the feed to the reactor, and the vent gas. The design conditions and results are summarized in the table below. Reference to the accompanying figure shows diagrammatically the approximate location of the measurements. In the table and in the figure, T=temperature, P=pressure, V=flow, and S=sample, and V–1, T–1, P–1, S–1A, S–1B, V–2, T–2, P–2, V–3, T–3, P–3, S–3, V–4, T–4, P–4, S–4A and S–4B are used in the table to designate respective flow, temperature, pressure and sample readings taken at locations correspondingly designated and shown in the figure.

In the experiments the analytical methods were as follows: $O_2$ analysis by an Orsat apparatus, $CH_4$ by a Lira infrared analyzer, upstream $NO_x$ by the peroxide method, downstream $NO_x$ by the Griess method. The percent recycle was calculated on the basis of $O_2$ analysis, $CH_4$ analysis and the temperature balances around the ejector and Deoxo reactor.

The waste gas, which was at approximately 427° C. and 100 p.s.i.g., was mixed with natural gas. It ignited in the reactor at temperatures as low as 343° C. to 349° C. Combustion was incomplete at this inlet temperature. After a short period of time when part of the outlet gases were recirculated the inlet temperature increased and at about 371° C. combustion was essentially complete.

In Experiment No. I (30% recycle) the content of $NO_x$ in the vent gas varied from 4 p.p.m. to 11.3 p.p.m. In Experiment No. II (60% recycle) the $NO_x$ content was in the range of 3.3 p.p.m. to 3.6 p.p.m. The lowest $NO_x$ content of 1.6 p.p.m. was obtained in Experiment No. 3 (100% recycle).

Experiments I–III show that any amount of effluent from the reactor from 0 to 100% can be recirculated by the use of an ejector. Also, that the use of the ejector enables the purification of tail gas streams containing up to 5.0% to 6.0% $O_2$, by diluting the waste gas with the purified recycle gas so as to lower the $O_2$ content. In this way the waste gas can be treated in a single stage reactor operating on the reducing side. The experiments also demonstrate the "boot strap effect," which allows start-up without having to heat the tail gas to the temperature required for essentially complete fuel combustion. As soon as a partial reaction takes place, the ejector-recycle system heats up the tail gas to a temperature at which essentially complete combustion occurs. The saving of fuel due to recirculation back to the reactor of the unused fuel in the recycle gas was noted above.

It will be noted that the ejector causes a slight increase in pressure loss across the tail gas abatement system. The pressure loss will increase with the increase of the amount of tail gas recycle. This in turn causes a slight decrease in power recovered by the expander. However, design calculations and results of the tests show that this additional pressure loss will be only 2 or 3 p.s.i. in a typical nitric acid plant requiring 30% to 40% recycle. (This is equivalent to 3.2% to 3.5% $O_2+NO_x$ in the plant waste gas.) The cost of the lost power is more than compensated by the extended catalyst life and by the savings realized from the savings in fuel and preheat temperature requirements.

The above experiments are merely illustrative of the process of this invention. The process design will vary depending, for example, on the composition and conditions of the particular waste stream to be purified, the fuel, the catalyst, the maximum allowable inlet temperature to the expanders and the permissible pressure drop. Power recovery can be effected in plant scale designs, as is well known to those skilled in the art. For example, the high residual energy in the vent gas may be utilized for steam production in waste heat boilers before using the vent gas to drive gas turbines. It will be appreciated that many modifications can be made in the design of the present process without departing from the scope and spirit of the invention.

What is claimed is:

1. In a catalytic process for purifying a noxious gas stream containing oxides of nitrogen and free oxygen which comprises admixing the noxious gas stream with a reducing fuel selected from the group natural gas, hydrogen, methane, ethane, propane, butane and naphtha, said fuel being present in excess of the stoichiometric amount required to react with all the oxygen and nitrogen oxides in the gas, and passing said admixture into a catalytic reactor containing a platinum group metal catalyst for catalytic reduction of the oxides of nitrogen, the improvement comprising feeding said admixture through an ejector directly to the catalytic reactor, recycling effluent from the reactor back to said ejector, and feeding the recycled effluent through said ejector to the catalytic reactor together with said admixture at a pressure of 80 to 100 p.s.i.g. and at a temperature at least as high as the ignition temperature of said reducing fuel in order to reduce the free (molecular) oxygen content of the feed to said reactor whereby the temperature rise caused by fuel combustion is substantially reduced in a single stage process.

TABLE.—TAIL GAS PURIFICATION—RECYCLE (EJECTOR) SYSTEM
Comparison of design conditions and results obtained

| Experiment number | Reference points | | Waste gas | | | | | Recycle | | | | Feed gas (to reactor) | | | | | Vent gas | | | | |
|---|---|---|---|---|---|---|---|---|---|---|---|---|---|---|---|---|---|---|---|---|---|
| | Condition | Percent cycle | V-1, Flow s.c.f.h. | T-1, temp., °C. | P-1, press, p.s.i.g. | S-1A percent $O_2$ | S-1B, percent $NO_x$ | V-2, flow, s.c.f.h. | T-2, temp., °C. | P-2, press, p.s.i.g. | V-3, flow, s.c.f.h. | T-3, temp., °C. | P-3, press, p.s.i.g. | S-3, percent $O_2$ plus $NO_x$ | V-4, flow, s.c.f.h. | T-4, temp., °C. | P-4, press, p.s.i.g. | S-4A, percent $O_2$ | S-4B, percent $NO_x$ p.p.m |
| I | Design | 30 | 2,350 | 390 | 90 | 3.0 | 0.2 | 690 | 782 | 84 | 3,040 | 482 | 86 | 2.46 | 2,350 | 782 | 84 | 0.0 | 0.0113, 11.3 |
| | Obtained result | 33.4 | 2,350 | 360 | 99 | 2.7 | | 790 | 593 | 91 | 3,140 | 421 | 94 | 2.0 | 2,350 | 665 | 92 | 0.0 | 0.0004 4 |
| | do | 36.6 | 2,310 | 349 | 98.5 | 4.1 | | 830 | 665 | 90.5 | 3,140 | 446 | 94 | 3.0 | 2,310 | 773 | 91 | 0.0 | 0.0007 7 |
| | do | 38.0 | 2,260 | 345 | 99 | 4.0 | 0.152 | 860 | 638 | 91 | 3,120 | 440 | 94 | 2.9 | 2,260 | 749 | 92 | 0.0 | 0.0007 7 |
| | do | 38.0 | 2,280 | 349 | 99 | 4.0 | | 860 | 643 | 91 | 3,140 | 443 | 94 | 2.9 | 2,280 | 751 | 92 | 0.0 | 0.0007 7 |
| II | Design | 60 | 1,875 | 482 | 90 | 3.8 | 0.2 | 1,130 | 482 | 81 | 3,005 | 482 | 84 | 2.5 | 1,875 | 782 | 82 | 0.0 | 0.00036 3.6 |
| | Obtained result | 60 | 1,875 | 345 | 99.5 | 3.2 | 0.154 | 1,125 | 616 | 90.5 | 3,000 | 440 | 93.5 | 2.0 | 1,875 | 686 | 91.5 | 0.0 | |
| | do | 60 | 1,875 | 335 | 100 | 4.8 | 0.161 | 1,125 | 496 | 91 | 3,000 | 393 | 94 | 3.0 | 1,875 | 726 | 92 | 0.0 | 0.00033 3.3 |
| | do | 61.3 | 1,875 | 338 | 100 | 5.0 | | 1,150 | 496 | 91 | 3,025 | 393 | 94 | 3.1 | 1,875 | 726 | 92 | 0.0 | 0.00033 3.3 |
| III | Design | 100 | 1,130 | 280 | 90 | 3.12 | 0.2 | 1,130 | 682 | 78 | 2,260 | 482 | 80 | 1.67 | 1,130 | 682 | 78 | 0.0 | 0.00016 1.6 |
| | Obtained result | 100 | 1,130 | 316 | 99 | 5.8 | 0.166 | 1,130 | 682 | 86 | 2,260 | 576 | 89 | 2.9 | 1,130 | 788 | 87 | 0.0 | |
| | do | 106 | 1,150 | 318 | 99 | 6.0 | | 1,220 | 660 | 86 | 2,370 | 602 | 89 | 2.9 | 1,150 | 780 | 87 | 0.0 | 0.00016 1.6 |

2. A process of claim 1 wherein the noxious gas is the tail gas of a nitric acid plant, said tail gas contains 2.0% to 6.0% oxygen, said recycling is sufficient to reduce the oxygen content in the catalytic reactor to less than 2.5%, said reducing fuel is methane or natural gas, and said temperature is about 393° C. to 602° C.

3. A process of claim 2 wherein the catalyst is comprised of palladium, and said temperature is 482° C. and said pressure is 90 to 100 p.s.i.g.

References Cited
UNITED STATES PATENTS 3,402,015  9/1968  Hardison et al. _____ 423—239
3,467,492  9/1969  Newman _____ 423—239

EARL C. THOMAS, Primary Examiner

U.S. Cl. X.R.

423—239